United States Patent [19]

Dinter et al.

[11] Patent Number: 5,135,724

[45] Date of Patent: Aug. 4, 1992

[54] PROCESS AND APPARATUS FOR THE SURFACE TREATMENT OF SHEET-LIKE STRUCTURES BY ELECTRIC CORONA DISCHARGE

[75] Inventors: Peter Dinter, Oestrich-Winkel; Hermann Funke, Altoetting; Klaus Matschke, Burgkirchen, all of Fed. Rep. of Germany

[73] Assignee: Hoechst Aktiengesellschaft, Frankfurt am Main, Fed. Rep. of Germany

[21] Appl. No.: 683,221

[22] Filed: Apr. 10, 1991

Related U.S. Application Data

[62] Division of Ser. No. 473,257, Jan. 31, 1990, Pat. No. 5,024,819.

[51] Int. Cl.$^5$ .................. B01J 19/08; C25D 13/00
[52] U.S. Cl. .................. 422/186.05; 204/180.4
[58] Field of Search .............. 422/186, 186.04, 186.05, 422/186.21, 186.22, 186.23; 204/164, 186.2, 186.4

[56] References Cited

U.S. PATENT DOCUMENTS

| | | | |
|---|---|---|---|
| 3,057,792 | 10/1962 | Frohlich | 204/165 |
| 3,069,283 | 12/1962 | Coleman | 427/41 |
| 3,281,347 | 10/1966 | Windex | 204/168 |
| 3,396,308 | 8/1968 | Whitmore | 250/326 |
| 3,507,763 | 4/1970 | McBride | 204/169 |
| 4,051,044 | 9/1977 | Sörensen | 250/531 |
| 4,615,906 | 10/1986 | Kolbe | 427/40 |
| 4,894,131 | 1/1990 | Jacobs et al. | 204/165 |
| 4,929,319 | 5/1990 | Dinter et al. | 204/164 |
| 4,940,521 | 7/1990 | Dinter et al. | 204/164 |
| 5,001,002 | 3/1991 | Gribbin et al. | 428/245 |
| 5,013,601 | 5/1991 | Bothe et al. | 428/323 |

FOREIGN PATENT DOCUMENTS 722875  2/1955  United Kingdom.

OTHER PUBLICATIONS

Condensed Chemical Dictionary, 10th Ed. Hawley, 1981.

Primary Examiner—Brooks H. Hunt
Assistant Examiner—Daniel J. Jenkins
Attorney, Agent, or Firm—Gregory N. Clements

[57] ABSTRACT

The process of the present invention is for the surface treatment on both sides of a substrate by means of electric corona discharge, while simultaneously treating both surfaces of the substrate with a carrier gas/aerosol mixture introduced into the corona discharge zone. The arrangement for carrying out this process comprises a corona discharge device, consisting of a generator, high voltage electrodes, to which alternating current is applied by the generator, as well as grounded counter electrodes, a device for the atomization of liquid into a suspendable aerosol, which is connected via a transport line for the aerosol to the corona discharge device, and a blower, which is connected to the atomizer device and conveys the carrier gas/aerosol mixture to the corona discharge device. The electrodes and counter electrodes together form a gap for the substrate to be treated.

6 Claims, 4 Drawing Sheets

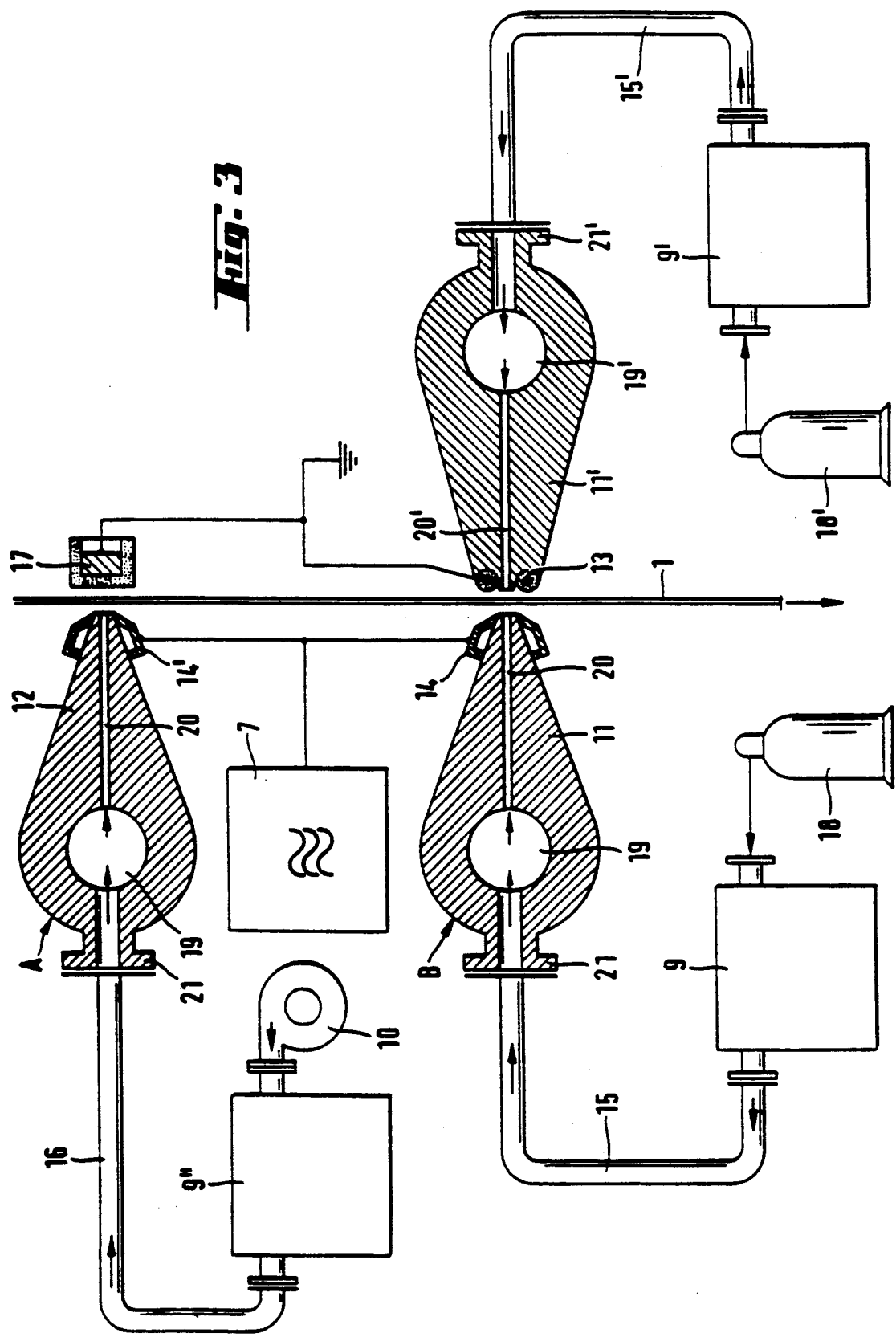

PROCESS AND APPARATUS FOR THE SURFACE TREATMENT OF SHEET-LIKE STRUCTURES BY ELECTRIC CORONA DISCHARGE

This is a division of application Ser. No. 07/473,257 filed Jan. 31, 1990 now U.S. Pat. No. 5,024,819.

BACKGROUND OF THE INVENTION

1) Field Of The Invention

The invention relates to a process for the surface treatment of a sheet-like structure, in particular in the form of web-shaped or sheet-shaped substrates, by means of electric corona discharge. The electric corona discharge takes place in an electrode system between electrode and counter electrode, between which the sheet-like structure is located. The invention also relates to an apparatus for carrying out this process, as well as to sheet-like structures which are treated according to the process or with this apparatus.

2) Prior Art

In many cases, the normally smooth surface of sheet-like plastics structures, in particular of films, presents difficulties to the extent that the film webs, having extremely good slip, readily tend to telescope during winding onto a reel. Further difficulties arise during upgrading to increase the adhesion of printing inks, lacquers, adhesives, vapor-deposited metals and the like on account of the smooth surfaces of sheet-like plastics structures.

Due to their chemical composition, many materials are not conductive to electric current or only to an extent which cannot be measured in practice, and therefore are generally considered as insulators. The low conductivity of these materials is, however, the cause for these materials to often collect on their surface very high electrostatic charges which, in particular in the case of sheet-like polymer products such as films or sheets, can result in a great many disadvantageous disturbances, such as uselessness of the product, and which for this reason are highly undesirable. The charges arise during production, further processing, or use of the films or sheets wherever friction occurs on edges, turning bars, etc., or where two materials touch and subsequently separate again (separating events), for example at rollers. They may result in production disturbances, dust accumulations, the influencing of measuring and control instruments and even in explosions. Great static charges (more than 5000 V) can ignite gas/air mixtures of vaporizing solvents, and small static charges of less than 1000 V can optically impair or destroy the surface by the formation of streaks, dust marks and accumulations of dirt.

The size of the electrostatic charge depends on the electrical conductivity of the materials. Good conductors are, for example, metals, carbon black and graphite, which lose their charge immediately, while poor conductors, in particular untreated polymers, retain their charge over lengthy periods of time, namely seconds to minutes and even several days.

On plastics parts, generally their poor antistatic properties are undesirable. Electrostatically highly charged plastics parts present enormous difficulties during subsequent upgrading steps, such as for example coating, thermoforming or printing.

In order to overcome these difficulties, it is state of the art to perform chemical-physical surface modifications of plastics, in particular of films. A basic process, which only brings about changes on the surface of the plastic, consists in a treatment of the surface of the plastic by an electric corona discharge. For instance, according to German reference DE-A-3,247,795, a corona treatment of a plastic film web is performed by the film web being subjected on the upper side and/or underside to impingement by a corona, which produces different treatment intensities. For this purpose, the film web to be treated is passed over an electrically grounded roll and the electric charging is carried out by impinging one or both sides of the film web with an electric corona discharge, which is generated by applying a high-frequency alternating current of high voltage to an electrode arranged at a distance from the roll. The treatment is generally performed in air at atmospheric pressure.

The constantly increasing demands of the market for products with improved surface characteristics have also resulted in the development of processes using chemically reactive substances, which for example, break up certain chemical bounds in the surface and, as a result, change the surface characteristics of plastics.

A process for the chemical-physical surface treatment of plastics moldings is described in German reference DE-A-3,705,482, in which selected reaction mechanisms are initiated on the treated substrates by incorporation of liquids atomized into aerosols into an alternating current corona discharge. In the apparatus, the substrate to be treated is passed through a discharge gap, which is formed by a roll at ground potential with a dielectric covering as counter electrode, and with electrodes under high voltage, and into which an aerosol is blown from a separate atomizer device by means of a carrier gas.

It is also state of the art to expose sheet-like substrates to a corona discharge on both surfaces, in order to achieve a treatment on both sides. For instance German reference DE-B-1,779,400 describes an electrode arrangement in which the film web to be treated wraps around two roll electrodes in the shape of an "S". However, this apparatus is not suitable for allowing an aerosol to act on both surfaces of the film during the corona discharge. The direct contact of the first-treated substrate surface, possibly still moist from the aerosol, with the following corona roll may result in damage to the aerosol layer applied, and there is also the risk of electrical breakdowns occurring on the substrate, and possibly also the electrode roll being destroyed. Although the apparatus known from British reference GB-A-722,875 for the two-sided treatment of plastic films by corona discharge is suitable for the direct simultaneous corona treatment of a web-shaped substrate, it rules out the selective feeding of an aerosol into the discharge gap on account of its compact, closed construction.

SUMMARY OF THE INVENTION

The object of the invention is to design the process and the apparatus, as they are described in German reference DE-A-3,705,482, in such a way that sheet-like structures can be treated on both surfaces with reactive substances in liquid form, it also being possible at the same time for these substances to be applied as special layers to the surfaces of the molding materials for upgrading of the same.

The further development of the process and of the arrangement emerges from the claims.

The process of the present invention is for the treatment of the surface of web-shaped or sheet-shaped substrates by means of electric corona discharge. The treatment is performed simultaneously on both surfaces of the substrate. The corona discharge is performed between voltage-carrying electrodes and grounded counter electrodes, which together form the corona discharge zone. Electrodes and counter electrodes are in each case arranged approximately at the same distance from each other, this mutual distance having to remain constant as far as possible over the entire width of the film to be treated. Electrodes and counter electrodes form a gap, through which the sheet-like substrate is passed, preferably centrally, without touching the electrodes and counter electrodes.

In the treatment of electrically non-conductive substrates, the surface of the grounded counter electrode and in the treatment of electrically conductive substrates the surface of the voltage carrying electrode is electrically insulated by sheathing with a dielectric material.

During the corona discharge a suspendable aerosol of atomized liquid droplets, Which is supplied from a suitable atomizer device with a carrier gas is allowed to act as simultaneously as possible on both surfaces of the substrate. In order to ensure the simultaneous action of corona discharge and aerosol impingement, the distance between the slot nozzle for the aerosol and the electrode or counter electrode should be as small as possible and should not exceed 80, in particular 60 mm.

In a preferred embodiment, the atomized liquid consists of droplets having an average, i.e, most frequent size of less than 20, preferably less than 10, and in particular less than 5 micrometers. Aerosols produced with ultrasonic vibration systems exhibit relatively small liquid droplets, preferably in the range from 2 to 10 micrometers. The average droplet size of the aerosol is the average droplet diameter. It is obtained from the determination of the droplet size distribution, as is described in Chem.-Ing. Techn. 58 (1986), pp. 895–897, VCH Verlagsgesellschaft, Weinheim. Apart from air and nitrogen, various noble gases come into consideration as carrier gas. It transports the aerosol over relatively long distances to its place of use.

From the above, one skilled in the art can ascertain that, in the broadest sense, the present invention relates to a process for the surface treatment of a web-shaped substrate, comprising: simultaneously corona treating both surfaces of a web-shaped substrate in a corona discharge zone lying between at least one voltage-carrying electrode and a grounded counter electrode; and simultaneously introducing an aerosol of atomized liquid into said corona discharge zone by means of a gas stream, whereby said corona treatment is performed on both surfaces of said web-shaped substrate in the presence of an aerosol adjacent both surfaces.

The arrangement for carrying out this process comprises a corona discharge device, consisting of voltage-carrying electrodes, a generator which applies a high-frequency alternating current of high voltage to the electrodes during execution of the process, as well as counter electrodes, which are arranged a distance from the electrodes and are grounded. The high voltage electrodes together with the opposite counter electrodes form a gap, the height of which is greater than the thickness of the substrate to be treated, so that the latter can pass between the high voltage electrodes and counter electrodes without touching them. Other component parts of the arrangement are an atomizer device for the atomizing of liquid into small liquid droplets in the form of a suspendable aerosol and a blower, with which the carrier gas is blown during implementation of the process at a regulatable rate into the atomizer device and is passed from there as carrier gas/aerosol mixture via a transport line to the corona discharge zone, where it acts on both substrate surfaces.

From the above, one skilled in the art can ascertain that, in the broadest sense, the present invention also relates to a corona discharge device for treating the surfaces of a web-shaped substrate, comprising: a corona discharge device having a generator; at least one high voltage electrode, electrically coupled to the generator; a grounded counter electrode spaced a distance from the high voltage electrode; an atomizer for creating atomized liquid, the atomizer being connected to the corona discharge device via a transport conduit for the atomized liquid; a blower connected to the atomizer to provide carrier gas or air to the atomizer to transport the atomized liquid through the transport conduit to the corona discharge device; wherein a web-shaped substrate when introduced into the corona discharge device between the high voltage electrode and the grounded counter electrode is subjected to a corona discharge treatment in the presence of an aerosol of atomized liquid.

In a preferred embodiment, the atomizer device consists of a piezoelectrically operating ultrasonic vibration system or the atomizer device has two-component atomizer nozzles operating at sound velocity. Piezoelectrically operating ultrasonic vibration systems utilize the inverse piezo effect, i.e., they convert electrical energy into mechanical distortion energy, which results in the atomization of liquid for the formation of an aerosol. In this atomization capillary waves are formed at the boundary between liquid and gas. With increasing ultrasonic amplitude droplets are produced. The maximum operating temperature for these systems is about 120° to 130° C. To facilitate the atomization, it may be expedient to increase the temperature of the liquid and/or of the carrier gas. Scarcely atomizable substances are mixed with a liquid as a carrier substance and converted into an aerosol. The rate of aerosol applied to the substrate surfaces can be increased by a longer dwell time of the substrate in the corona discharge zone. A further increase is achieved by the use of a plurality of atomizer devices and/or a voltage increase.

For the dissipation of the heat produced in the corona discharge, it is expedient to cool the electrodes internally and/or externally with a suitable medium. In cooling, the preferably gaseous cooling medium, for example air, is to be conducted in such a way that deposition of aerosol on the electrodes is prevented.

The corona discharge causes reaction mechanisms to be initiated which effect a chemical surface modification of the substrate. Depending on the type of aerosol liquid used and the carrier gas for the aerosol, active sites in the form of functional groups and radicals (which represent reaction partners for substances applied after the corona discharge) are produced in the treated surface of the molding. Depending on the type of liquids and carrier gases used, polymerizable or crosslinking layers can also be applied to the surface in a single process step. In many cases, extremely thin layers are adequate in order to change in a desired way the surface characteristics, such as for example the antistatic properties, abrasion resistance, slip properties, barrier behavior, adhesion of a web-shaped or sheet-shaped substrate. Suitable aerosols are described, for example, in German reference DE-A-3,705,482.

BRIEF DESCRIPTION OF THE DRAWINGS

Details of the process as well as of exemplary embodiments of the apparatus according to the invention are explained in more detail below with reference to the drawings, in which:

FIG. 3 shows a diagrammatic view of a further arrangement for the surface treatment with two corona discharge devices on both sides of a sheet-like substrate as it passes vertically downward;

Figure 1:
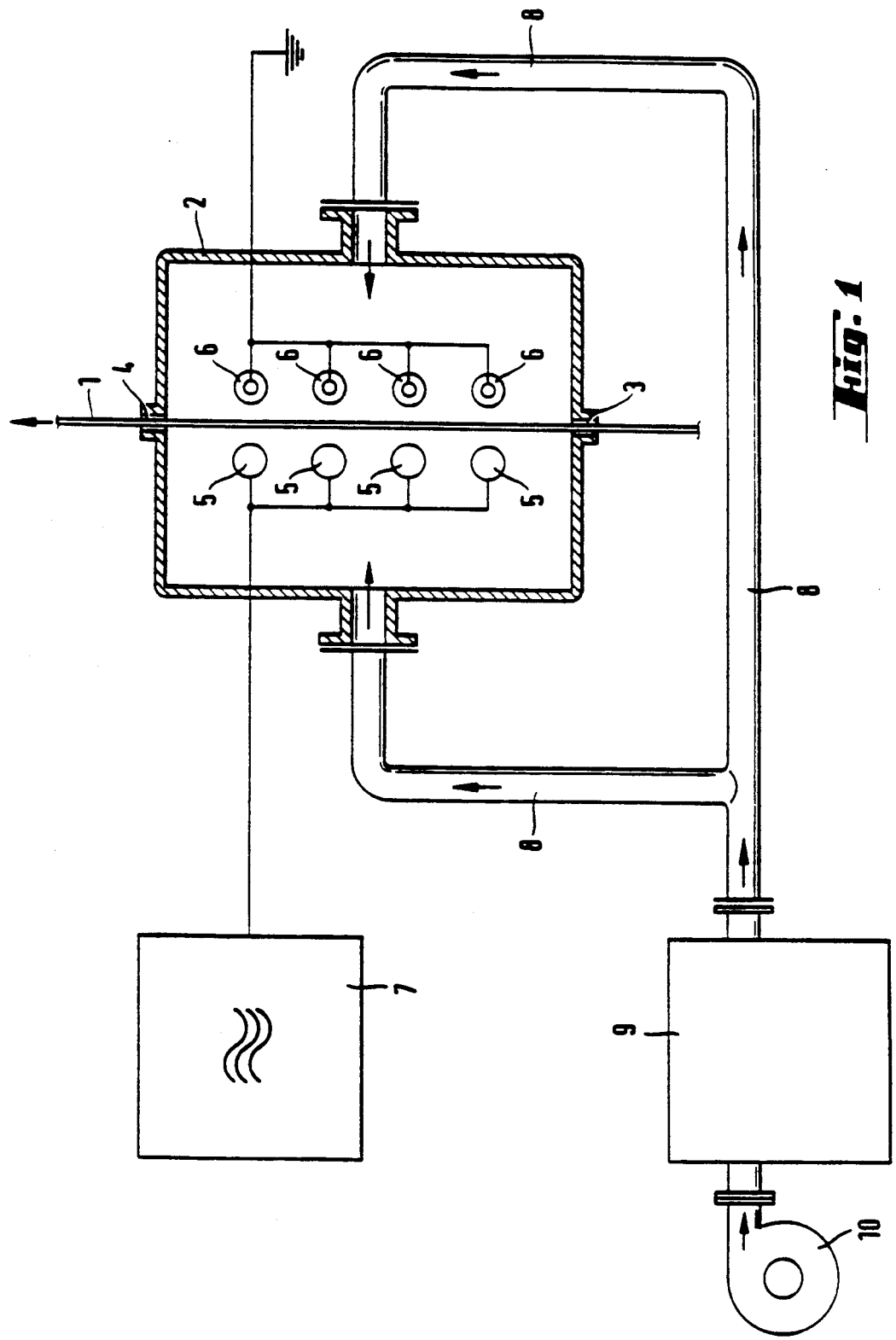
FIG. 1 shows a diagrammatic view of an arrangement for the surface treatment by means of an electric corona discharge on both sides of a sheet-like substrate as it passes vertically upward.

The arrangement of FIG. 1 consists of a housing or a chamber 2 with an inlet gap 3 and an outlet gap 4, through which a web-shaped or sheet-shaped substrate 1, for example a PVC film having a thickness of 100 $\mu$m, is transported vertically upward in a straight line in arrow direction at a rate of, for example, 60 m/min. For the facilitated and troublefree introduction of the substrate 1 into the housing 2 at the beginning of the process, the housing 2 has mechanical elements (not shown) for the opening or swinging open of the housing 2. In the housing 2, the metallic electrodes 5 and the grounded counter electrodes 6, which counter electrodes are sheathed with dielectric material, for example ceramic, are arranged at uniform distance from each other and form a continuous, clear gap, through which the substrate 1 freely passes. The housing 2 shields the electrodes 5 and the counter electrodes 6 from the surrounding environment.

In a modification of the embodiment of FIG. 1 (not shown), electrodes and counter electrodes alternate with one another on each side of the substrate.

Regarding the most favorable electrode configuration, such systems should be preferred which have a large free cross-section and do not impede the passage of the aerosol into the corona discharge zone. Wires, fins, combs, blades or cylindrical rollers meet this requirement adequately. The mutual distance of the electrodes 5 and of the counter electrodes 6 should be at least 5 mm, and in particular 10 mm, in order to make possible an adequately easy access of the aerosol to the substrate.

The distance of the electrodes 5 from the opposite counter electrodes 6, i.e., perpendicular to the plane of the substrate web, is usually 1.5 to 3 mm during treatment of films. The substrate 1 is moved centrally through the electrode gap.

In order to avoid With certainty any contact between the film and electrode or counter electrode, it is expedient to keep the mutual distance between electrodes and counter electrodes as large as possible. In an individual case, this distance will therefore be increased up to 7 to 10 mm. However, the electric energy must also be increased correspondingly (higher generator output), in order to ensure an adequate corona discharge.

A high frequency alternating current of high voltage is applied to the electrode system by a generator 7. Commercially available corona generators which usually operate in a frequency range from 3 to 100 kHz and at a voltage of 5 to 20 kV can be used.

The treatment chamber 2 is in connection with the atomizer device 9 via a rigid pipeline system, a hose line or other flexible line 8. The atomizer device 9 serves for the atomization of the respective liquid into a suspendable aerosol, which is blown into the treatment chamber 2 by means of a carrier gas or air stream supplied by means of a blower 10 which can be regulated in the rate of throughput. Atomizer devices which may be employed comprise two-component atomizer nozzles, in which the liquid is atomized into tiny droplets by air emerging at sound velocity and piezoelectric ultrasonic vibration systems which, by their oscillations, induce the liquid to perform corresponding oscillations and atomize it into tiny drops for use in the aerosol. The aerosol introduced or blown into the housing 2 by means of blower 10 is distributed uniformly inside the housing 2 and migrates along the lines of flux which run from the electrodes 5 and counter electrodes 6 in the direction of the substrate 1, onto the substrate surfaces and is precipitated there. This produces a very uniform wetting or coating of the substrate 1 on both sides with the aerosol, whereby a very uniform modification of the surface characteristics of the substrate takes place.

Figure 2:
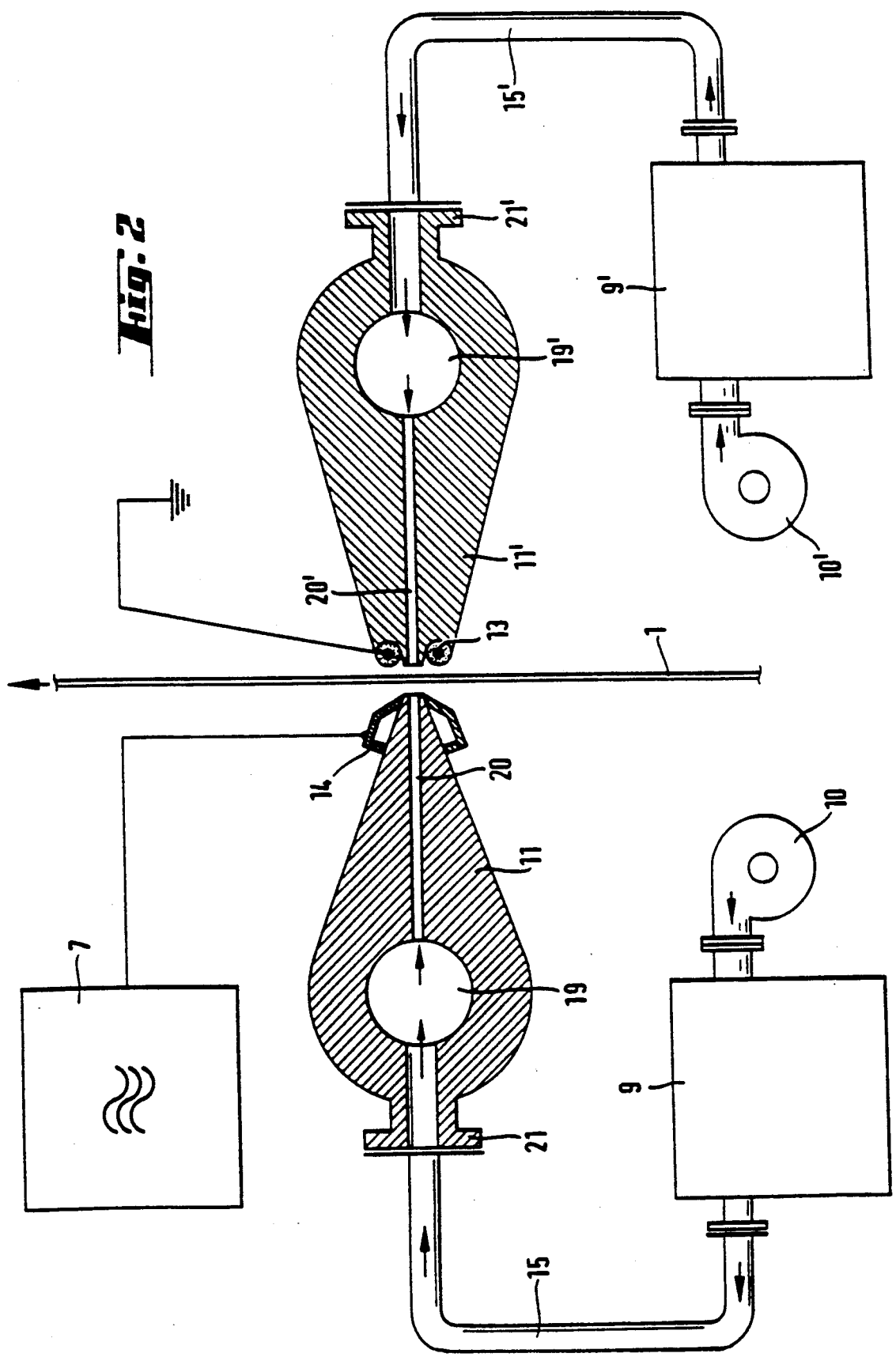
FIG. 2 shows a diagrammatic view of an arrangement with a corona discharge device, arranged at the outlet gap of two slot air nozzles for the surface treatment on both sides of a sheet-like substrate passed vertically upward.

The arrangement of FIG. 2 differs from the version of FIG. 1 in that the treatment takes place between two opposite slot nozzles 11 and 11', arranged on each side of the substrate 1 to be treated, which is moved upward in the direction of the arrow. Its structural design is to the greatest extent the same as that of the conventional air knife or air brushes, as are known for the spreading and uniform application of liquid coatings on films. For the uniform pressure distribution of the mixture of aerosol and carrier gas, the nozzles 11 and 11' contain hollow, tubular pressure spaces 19, 19' of circular cross-section extending over the entire width of the substrate, as well as outlet gaps 20, 20', directed from the corresponding pressure space toward the substrate 1.

Positioned at the nozzle lips, which bound the outlet gap of the nozzle 11', are grounded counter electrodes 13, sheathed with a dielectric material, in the form of metal wires which are drawn or fused into quartz glass tubes. The nozzle lips of the nozzle 11 are equipped with high voltage carrying electrodes 14 in the shape of metallic flat profiles. The electrodes 14 form integral component parts of the air nozzle 11 and are adjacent the outlet gap 20. A high frequency alternating current of high voltage is applied to electrodes 14 by a generator 7. As a result, electric corona discharge is triggered between the electrodes 14 and the grounded counter electrodes 13, creating the lines of flux through which the substrate web 1 is passed.

The nozzles 11 and 11' are in connection with atomizer devices 9 and 9' and the regulatable blowers 10 and 10' via diagrammatically represented pipelines or hoselines 15 and 15', which are fastened to flanges 21, 21'. The aerosols emerging from the air nozzles 11, 11' pass directly into the field of the corona discharge. Due to the electric field around the electrodes 14, the aerosol droplets are held in the electric field and are prevented from becoming an uncontrolled stray into the surroundings, which amounts to both a further improved uniform application of the aerosol applied to the two substrate surfaces and to a substantially loss-free utilization of the quantity of aerosol offered.

This design allows the simultaneous surface modification of both sides of the substrate 1 with similar or different aerosols. The advantage of the slot nozzles fulfilling the electrode function is due to their aerodynamic design in the manner of air knives, which ensures a uniform aerosol impingement of the substrate web independently of its width. The opposed position of the two nozzles 11 and 11' is particularly advantageous for a central guidance of the substrate web through the electrode gap. The air jets emerging from the two nozzles already provide a stable central web guidance. The web guidance also experiences a distinct improvement by the force of the electric field between the pairs of electrodes, acting on the substrate web.

In a modified electrode arrangement of FIG. 2 (not shown), there is on each side of the substrate, respectively at each nozzle, both a high voltage-carrying electrode and a grounded counter electrode.

An essential feature of the design variant shown in FIG. 3 is the multiple treatment on both sides of a web-shaped or sheet-shaped substrate 1 in successive steps, with both different liquids or aerosols being employed and different application methods being used. In this case, the substrate 1 passes downward in the direction of the arrow through the discharge zones or gaps of two treatment stations (A) and (B), which are arranged one after the other and both consist of slot nozzles 11 and 12, fitted with high voltage carrying electrodes 14 and 14', as well as the grounded counter electrodes 13 and 17, which are sheathed with a dielectric material and are arranged at a distance from the said voltage carrying electrodes 14, 14'. A high frequency alternating current of high voltage is applied to the electrodes 14, 14' by the generator 7. While station (A) only allows an aerosol application on one side, station (B) allows a surface modification of the substrate 1 simultaneously on both sides, on account of the additional slot nozzle 11' with the counter electrode 13. Due to the electric field around the electrodes 14, 14', the aerosol droplets are kept in the electric field and are prevented from becoming an uncontrolled stray into the surroundings, which has the effects both of a further improved uniform application of the aerosol layers applied to the substrate surfaces and of a substantially loss-free utilization of the amount of aerosol offered.

The corona treatment inevitably carried out in station (A) on the surface of the substrate 1 facing the counter electrode 17 can also be utilized as an additional surface activation before the subsequent aerosol application of the station (B) by nozzle 11'.

The slot nozzles 11, 11', 12 are in connection with the associated atomizer devices 9, 9', 9" via diagrammatically drawn pipelines or hoselines 15, 15', 16. While the aerosol produced in the atomizer device 9" may be transported into the slot nozzle 12 with air as carrier medium, by means of a blower 10 which can be regulated in speed, this same object can be achieved in atomizer devices 9 and 9' with reactive carrier gases which are specifically adapted for the treatment process and are fed in from the gas cylinders 18 and 18'.

The advantageous process variant of FIG. 3 illustrates that the process according to the invention with the combination of liquid an gaseous reaction partners allows the widest variety of possibilities for surface modification on both sides. Depending on the type of substances used, polymerizable or crosslinking layers can also be applied to both substrate surfaces. For reasons of safety, it is expedient to shield the corona treatment zones shown in FIGS. 2 and 3 from the surroundings by a housing (not shown), in an analogous way to that in FIG. 1. Furthermore, it should be pointed out that, although the vertical substrate advancement shown in the figures is preferred, the process according to the invention can also be executed with horizontal substrate advancement.

Although, in view of the polarization of the electrodes, the apparatuses shown in FIGS. 1 to 3 are exclusively intended for the surface modification of electrically non-conductive substrates, such as for example plastics films, paper, woven or knitted fabrics, they can also be used to treat electrically conductive substrates, for example pure metal foils, metallized plastics films, plastics films or paper partially or completely printed with conductive printing inks, metallized woven or knitted fabrics, conductive textile fibers, such as for example carbon fibers, etc. The only prerequisite for this is a polarity reversal of the electrode system, i.e., the high voltage must be applied from the metallic electrodes 14 and 14' to the insulated electrodes 13 and 17. This means that the insulated electrodes 13 and 17 become the voltage carrying electrodes while the metallic electrodes 14 and 14' form the grounded counter electrodes. This measure is absolutely imperative, as otherwise current flows away via the conductive aerosol and, as a result, the electric field necessary for the corona discharge cannot be built up. This arrangement also allows for the treatment of electrically non-conductive substrates. In principle it is also possible to operate without polarity reversal. In this case, however, the metallic electrodes 14 and 14' must be electrically insulated by means of a dielectric material.

Figure 4:
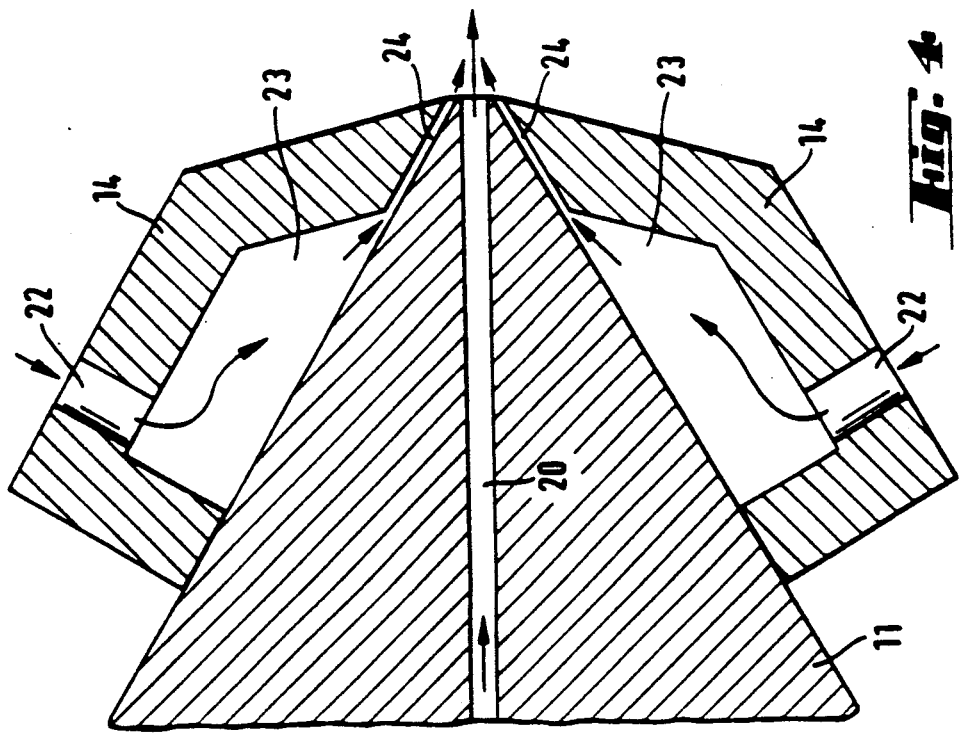
FIG. 4 shows a cross-section enlargement through the outlet region of an expedient embodiment of nozzle 11 shown in FIG. 2.

FIG. 4 shows a cross-section through the outlet region of an expedient embodiment of the nozzle 11 according to the invention. Fastened on this nozzle in the region of the nozzle lips by fastening elements (not shown), such as for example screws, are two high voltage carrying electrodes 14 of metal in the form of hollow profiles. Via the inlet openings 22, a gaseous medium (air, gases) can be admitted to the accumulation channels 23 of the hollow profiled electrodes 14. This medium flows out via the nozzle gap 24 into the corona discharge region. It acts as a coolant for dissipation of the heat produced during the discharge and also as a barrier medium for the aerosol emerging from the gap 20.

Figure 5:
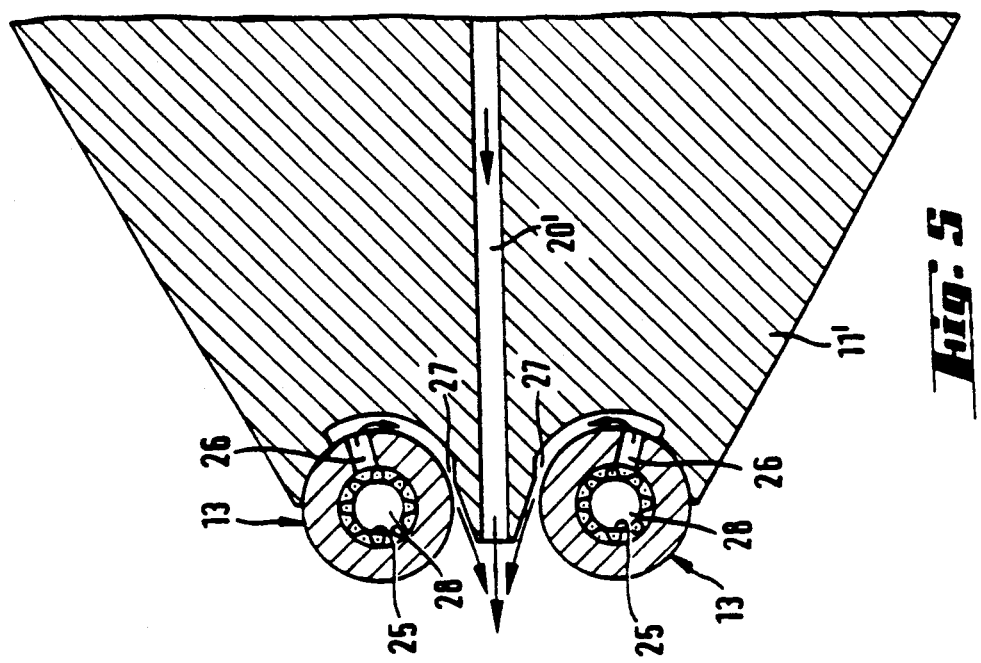
FIG. 5 shows a cross-section enlargement through the outlet region of an expedient embodiment of nozzle 11' shown in FIG. 2.

FIG. 5 shows a cross-section through the outlet region of an expedient embodiment of the nozzle 11'. Two grounded counter electrodes 13, consisting of dielectric material such as glass or ceramic and in the form of hollow tubes, are fastened in the lip region of this nozzle 11' and form with the nozzle 11' the air gap 27. The hollow profile electrodes 13, equipped with perforation bores 26, are fitted, for example, with a rolled-together, permeable woven mesh 25 of metal as the ground electrode. Air or gas can be admitted to the hollow profile electrodes 13 via the axial inlet bores 28, which air or gas passes out of the bores 26 into the gap 27 and subsequently into the corona discharge region, as a barrier medium against the aerosol.

Apart from the electrode designs shown, other versions (not shown) are also conceivable in which the electrodes are made from corresponding sintered materials, so that a flowing-out of the air intended for cooling from the pores of the sintered material is possible.

The present process according to the invention for the simultaneous modification of substrate surfaces on both sides by means of electric corona discharge considerably broadens the possibilities of chemically changing the surfaces by the inclusion of liquids, specifically in the form of aerosols, in the discharge process. Depending on the type of liquids and carrier gases used for the aerosol transport, surface modifications adapted exactly to the following upgrading steps can be adjusted or independent functional layers applied to the treated substrate. The treatment operation, to be carried out simultaneously on both sides, on the one hand reduces the technical expenditure associated with the process, and consequently the costs, and on the other hand also makes possible in a simple way the treatment of sensitive materials by avoiding contacts of the substrate with any mechanical carrier or guide elements, such as for example rolls, rollers, rails, etc.

What is claimed is:

1. A process for the surface treatment of a web-shaped or sheet-shaped substrate by means of an electric corona discharge, comprising:
    (1) passing said substrate into a corona discharge zone lying between at least one voltage carrying electrode and at least one grounded counter electrode;
    (2) corona treating said substrate in said corona discharge zone by applying a high voltage current to said at least one voltage carrying electrode;
    (3) simultaneously introducing into said corona discharge zone an aerosol consisting of atomized liquid and either a gas or air stream, whereby said corona discharge and said aerosol introduction occurs simultaneously on both sides of said substrate in the region of said corona discharge for the purpose of reacting said liquid with said substrate zone.

2. The process as claimed in claim 1, wherein the atomized liquid consists of droplets having an average size of less than 5, in particular less than 3 micrometers, which have preferably been produced by atomization of the liquid with ultrasound.

3. The process as claimed in claim 1, wherein said atomization includes atomization of different liquids, said different liquids being blown by said air or gas stream onto opposite surfaces of said substrate in the region of said corona discharge zone.

4. The process as claimed in claim 1, wherein at least one of said surfaces of said substrate is exposed to a plurality of a corona discharge zone.

5. The process as claimed in claim 3, wherein at least one of said surfaces of said substrate is exposed to a plurality of a corona discharge zone.

6. A process according to claim 1, wherein said at least one voltage carrying electrode are coupled with a high frequency generator having an alternating current of 0.1 to 10 amps at a voltage of 5 to 100 kV and a frequency of 3 to 100 kHz.

* * * * *